March 2, 1965     J. W. COLEMAN     3,171,958
HEATED SPECIMEN HOLDER FOR THE ELECTRON MICROSCOPE
Filed March 30, 1962     2 Sheets-Sheet 1
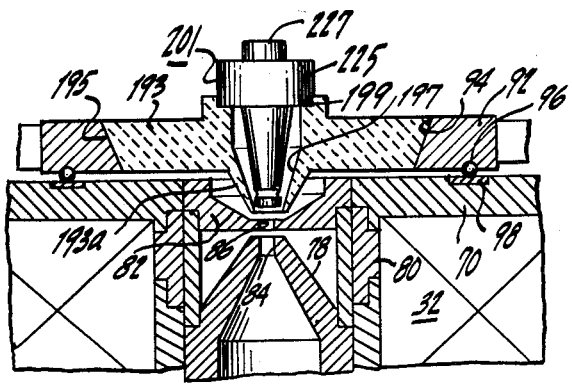
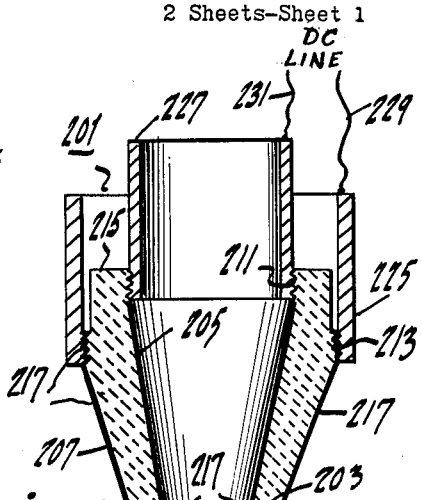
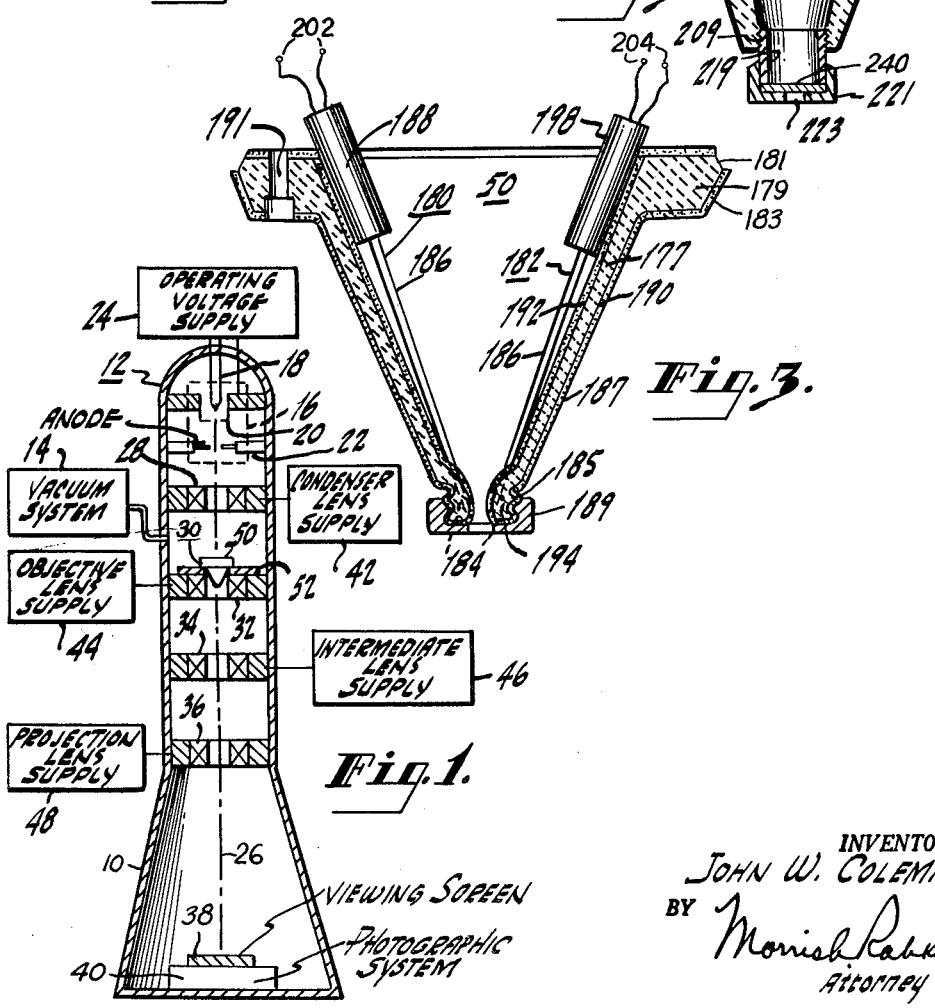
INVENTOR.
JOHN W. COLEMAN
BY
Attorney March 2, 1965 J. W. COLEMAN 3,171,958
HEATED SPECIMEN HOLDER FOR THE ELECTRON MICROSCOPE
Filed March 30, 1962 2 Sheets-Sheet 2

INVENTOR.
JOHN W. COLEMAN
BY
Attorney

United States Patent Office 3,171,958
Patented Mar. 2, 1965

3,171,958
HEATED SPECIMEN HOLDER FOR THE
ELECTRON MICROSCOPE
John W. Coleman, Philadelphia, Pa., assignor to Radio
Corporation of America, a corporation of Delaware
Filed Mar. 30, 1962, Ser. No. 183,965
10 Claims. (Cl. 250—49.5)

This invention relates to specimen supports or the like for use in instruments for the examination of microstructure, and more particularly to means for the creation and control of the environment of a specimen under examination. While the present invention is generally useful in any scientific instrument which handles specimens, it is especially suitable for use in the specimen stage of an electron microscope.

Recent advances in technology have brought about the need for more data on the microstructure of physical and biological materials at temperatures far above the ambient temperatures and which may, for example, range from the ambient temperature to very high temperatures in the neighborhood of 1200° C.

The electron microscope has long been used for the examination of, and for obtaining data on, microstructure. However, the conditions of high vacuum within the electron microscope column and the sensitivity of the microscope to changes in its physical dimensions and to specimen excursions, which might be thermally induced, have heretofore prevented the introduction of satisfactory means for changing the temperature environment over the desired temperature range of a specimen undergoing electron microscope examination.

Some of the problems which are encountered in attempting to operate an electron microscope specimen stage at temperatures far removed from ambient temperatures are the following:

(1) Dimensional changes which produce deterioration of and/or aberrations in the image formed by the electron optics of the microscope.

(2) Significant thermally induced excursions of the specimen during examination, and particularly during the taking of photomicrographs.

(3) Image deterioration and loss of resolving power because of disposition of magnetic and electric field producing and distorting elements in the vicinity of the electron beam.

(4) Miniaturization of the heating equipment so that it may occupy the space allotted in the microscope for the specimen stage.

It is therefore an object of the present invention to provide improved instrumentation for controlling the environment of a specimen under examination, which instrumentation is especially adapted for use in electron microscopes and which substantially overcomes the above-mentioned problems.

It is a still further object of the present invention to provide, for a scientific instrument, a specimen stage which is especially adapted for use in an electron microscope and which is capable of heating a specimen to high temperatures of the order of 1200° C.

It is a still further object of the present invention to provide a specimen stage for an electron microscope wherein a specimen may be heated to very high temperatures by means of the support which mounts the specimen in operating position.

It is a still further object of the present invention to provide a device for heating a specimen to very high temperature without thermally or electrically inducing any adverse effects on the electron optics of the microscope.

It is a still further object of the present invention to provide a device for heating a specimen to high temperatures without substantially deteriorating the image because of electrical and mechanical thermal instabilities which affect the formation of the image.

It is a still further object of the present invention to provide a device for heating a specimen while it is held in operating position in an electron microscope, which device is efficient in obtaining very high temperature for low power expenditure.

It is a still further object of the present invention to provide a device for heating specimens in an electron microscope and which is low in cost and may be readily installed and readily operated.

It is a still further object of the present invention to provide, for an electron microscope, an improved specimen holder device capable of heating a specimen and adaptable for use as an accessory to an electron microscope.

Briefly described, the invention is embodied in a specimen stage for an electron microscope, in which stage a specimen may be heated to very high temperatures. The specimen stage includes a plate which has an opening therein through which the electron beam generated by the source of illumination in the microscope can pass. The stage also includes a specimen holder made of an insulating, refractory body of conical shape having an opening therethrough. The body is removably received in the plate opening. The interior and exterior walls of this body and the apical end of the body are coated with an electrical resistance film which may have a substantially uniform thickness. Electrical connections are separately provided to the inner edges of the film on respective interior and exterior walls so that an electrical circuit can be completed which extends along the exterior wall, around the apical end surface, and back along the interior wall. Since the shape of the body is conical, the resistance of that part of the film which surrounds the apical end of the body will be greater than the resistance of the remainder of the film. Accordingly, and also because of the heat flow in such a body, the heat generated by the electrical resistance of the film is concentrated around the apical end of the body. A specimen may be mounted at the apical end of the body and can be heated to very high temperatures. Since the body is disposed in the opening in the support, the specimen may be in the path of the electron beam while the specimen is heated. The geometrical configuration of the body and the coating thereon provide for sheets of current on the surfaces of the body which are symmetrical about the electron beam axis and which flow in opposite directions so as to have a negligible electromagnetic effect upon the electron beam and upon the optics of the microscope. The localized heating of the device in the region of the specimen also provides for improved efficiency and thermal stability of the device.

The invention itself, both as to its organization and method of operation, as well as additional objects and advantages thereof, will become more readily apparent from a reading of the following description in connection with the accompanying drawings in which:

FIG. 1 is a diagrammatic, longitudinal, sectional view of an electron microscope having a specimen stage according to the present invention in which a specimen may be heated;

FIG. 3 is a sectional view of the specimen holder device which is shown in the specimen stage of FIG. 2;

FIG. 4 is a fragmentary, sectional view, similar to FIG. 2, showing another form of specimen stage according to the invention; and FIG. 5 is an enlarged, sectional view of the specimen holder shown in FIG. 5.

General

Figure 2:
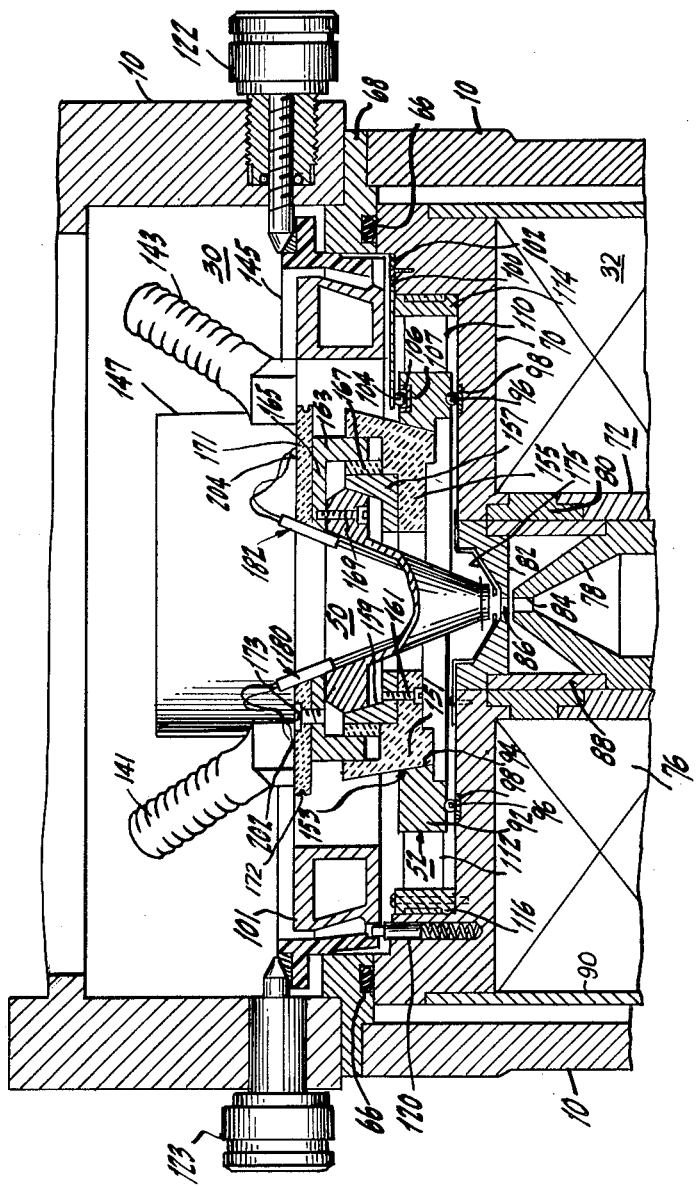
FIG. 2 is a fragmentary, sectional view of an electron microscope showing the specimen stage of FIG. 1 in greater detail.

Referring more particularly to FIG. 1, there is shown an evacuable casing or housing 10, part of which forms the column of an electron microscope 12. The housing may be evacuated by a vacuum pumping system 14. The microscope 12 includes a source 16 of electron beam illumination provided by an incandescent filament 18, a cathode 20 and an anode 22. The filament 18 is energized by a source of filament voltage in an operating voltage supply 24. A difference of potential which may, for example, be 100 kilovolts between the cathode 20 and the anode 22 is provided by the voltage supply 24. The source of illumination 16 projects a beam of electrons shown along the path of the dash line 26 through a condenser lens 28, a specimen stage 30, an objective lens 32, an intermediate lens 34 and a projection lens 36 upon a target in the form of a fluorescent viewing screen 38.

A photographic system 40 is disposed below the viewing screen 38 for the purpose of taking photomicrographs of an image of the specimen. The viewing screen is shifted out of the way of the photographic system when photomicrographs are to be taken. The lenses are operated by current from different lens power supplies 42, 44, 46 and 48. These supplies include sources of direct current, with a common ground connection, and electrical control equipment, such as potentiometers, which provide current for energizing the various lenses.

The electron microscope 12, so far described, may be similar to the type EMU-3 electron microscope which is manufactured and sold by Radio Corporation of America, Broadcast and Communications Products Division, Camden 2, New Jersey and is described in instruction books issued by Radio Corporation of America, such as their instruction book IB-39031-3, Radio Corporation of America, Camden 2, New Jersey (1960).

The specimen stage 30 embodies the invention and includes a specimen holder 50 which is mounted on a movable plate 52 carried by the microscope column and supported on the spool of the objective lens 32. This specimen holder 50 also includes means for heating the specimen contained in the holder 50 to very high temperatures (e.g., 1200° C.).

Specimen stage

Referring, now, to FIG. 2 of the drawing, there is shown a portion of the evacuable housing 10 which provides the microscope column. This housing 10 is cylindrical in shape and is made up of a plurality of parts between which vacuum seals or gaskets are interposed in any suitable manner known in the microscope art. One of these seals, an O-ring 66, is shown in FIG. 2. This O-ring 66 is disposed between one of the rings 68 of magnetic material (steel, for example) and the upper flange 70 of the spool 72 of the objective lens 32.

A coil 76 of the objective lens 32 is wound around the spool 72 between the flange 70 and another flange (not shown). One of the objective lens pole pieces 78 is mounted within the spool 72. The spool is made up, in part, of a ring 80 of non-magnetic material, such as brass. Another pole piece 82 of the objective lens is mounted adjacent the upper flange 70 of the spool. The pole pieces 78 and 82 have apertures 84 and 86, respectively. The upper and lower pole pieces 82 and 78 are also spaced from each other by a non-magnetic cylinder 88. A sleeve 90 around the spool 72 helps to shield the objective lens from stray magnetic flux. The sleeve 90 is of magnetic material, such as iron or steel.

The upper flange 70 of the objective lens spool 72 provides a base or floor on which the specimen stage 30 of the microscope is mounted. Access to the specimen stage is through an opening (not shown) in the column 10. This opening may be closed by means of a door having a vacuum seal or gasket on the inside thereof. Accordingly, when the door is closed, the column may be evacuated by the vacuum pumping system 14 (FIG. 1).

The movable plate 52 (FIG. 1) of the specimen stage 30 comprises a disc 92 of Invar (a nickel alloy steel) having a conically tapered opening 94 through the center thereof. This opening provides a socket in which the mounting structure for the specimen is received.

The disc 92 is movable mounted on three ball bearings 96, two of which are shown in FIG. 2. The ball bearings 96 are held in cup-like recesses in the bottom of the disc 92 and ride upon inserts 98 of hardened steel in the upper flange 70 of the spool 72. The disc 92 is held down in position by three hold-down springs 100, one of which is shown in FIG. 2. These hold-down springs are screwed down on a shoulder 102 on the upper flange 70 of the objective lens spool 72. The two springs 100 which are not shown may be spaced approximately equidistantly from each other and from the illustrated spring circumferentially around the beam axis and are similarly anchored to the shoulder 102. Each spring 100 bears down on a ball bearing 104 which is disposed on a hardened insert 107 in a blind hole 106 in the top surface of the disc 92.

The mechanism for orienting the disc 92 includes a pair of screw-feed drive mechanisms (not shown) which engage two leaf springs 110 and 112. The leaf springs 110 and 112 are opposite each other and are held in position by means of clamping blocks 114 and 116, respectively. The clamping blocks 114 and 116 are held by screws on the upper flange 70 of the objective lens spool 72.

Refrigeration apparatus may also be placed in the stage 30 instead of the heating apparatus which is described herein. Such refrigeration apparatus includes a receptacle 101 having an annular hollow space for a liquid refrigerant, such as liquid nitrogen, which is introduced into and removed from the receptacle by way of flexible piping 141, 143. A case carrying a mount for a specimen to be refrigerated and a plurality of annular heat exchangers extending inwardly from the specimen mount and outwardly from the refrigerant receptacle is also part of the refrigeration apparatus. The refrigerant receptacle 101 is mounted on the flange 70 of the lens spool 72 by means of three spring-biased insulating plugs 120, one of which is shown in FIG. 2. An axially movable, flanged ring 145 is disposed around the receptacle 101. Two radially movable plunger mechanisms 122 and 123 cooperate with the ring for axially shifting the refrigerant receptacle 101 with respect to the specimen mounting of the refrigeration apparatus in order to obtain different modes of cooling (by conduction or by radiation, for example) therein. The refrigerant receptacle and its mounting means remain when the case is removed.

The liquid refrigerant may be introduced into the refrigerant receptacle 101 even when refrigeration is not desired, since the chilled receptacle 101 and a baffle plate 147 mounted thereon serve as a cold trap form of vacuum pump. No appreciable cooling of the specimen takes place since the refrigerant receptacle is spaced and insulated therefrom. The vacuum port for the microscope is not shown in FIG. 2 since it is behind the baffle plate 147.

Specimen stage heating apparatus

The specimen stage heating apparatus includes an annular insulating member 151, preferably of refractory material such as a ceramic. This member 151 is in the form of a ring having a frusto-conical outer wall 153 which is supported in and on the conical wall of the opening 94. The bottom of the specimen holder 50 is set just above the upper pole piece 82 of the objective lens 32 because of the complementary tapers of the wall 153 and the wall of the opening 94. The annular member 151 has an internal flange 155 on which is seated a metal cup 157 having a conical, inwardly sloping, inner wall 159 which engages the specimen holder 50. The bottom of the cup 157 has a circular opening through which the holder 50 extends downwardly. The cup 157 is held in position on the annular member 151 by means of a plurality of screws 161, only one of which is shown in FIG. 2. The cup 157 serves as a contact or electrode for the holder 50, as will be explained more fully hereinafter.

Another contact or electrode for the holder 50 is provided by a flanged cylindrical ring 163 of metal. The flange 165 of the ring 163 is centrally apertured. The ring 163 and flange 165 may be separate parts, if desired. The ring 163 is separated from the outer wall of the cup 157 and electrically insulated therefrom by a cylindrical tube 167 of insulating material, desirably a ceramic. The flange 165 contacts the upper end of the holder 50 and is secured to the holder 50 by a plurality of screws 169, one of which is shown in FIG. 2. An apertured disc 171 of an insulating refractory, such as a suitable ceramic, covers the upper surface of the apertured flange 165 and extends beyond the outer periphery thereof. This disc 171 is secured to the flange 165 by means of screws 173, one of which is shown in FIG. 2. The entire heating device may be removed from the disc 92 by a plier-like tool which may engage a recess 172 around the rim of the disc 171. The disc 171 also serves as a heat shield for the holder 50. Two thermocouples 180 and 182 extend through holes in the discs 165 and 171 for measuring the temperature of the specimen, as will be explained later.

A liner 175 of heat reflective material, such as spun metal, in the form of an apertured, flanged cup is secured by means of screws (not shown) along the surfaces of the upper pole piece 82 which face the holder 50. This liner protects the pole piece 82 from intense, radiated heat by reflecting the heat away from the pole piece.

*Specimen supporting and heating element*

The specimen holder 50 constitutes a specimen supporting and heating element and is shown in greater detail in FIG. 3. This element includes a frusto-conical, tubular body 177 of a refractory such as a high alumina, dense ceramic. This body has a cylindrical flange 179 the outer, upper edge 181 of which is beveled. The peripheral wall 183 of the flange 179 is frusto-conical and tapers inwardly in a downward direction towards the axis of the body 177. The outer conical wall 190 of the body 177 has a few screw threads 185 formed therein near the apical end 194 thereof. The inner conical wall 192 of the body 177 is also necked inwardly near the apical end 194.

Two holes 184 are formed in the necked part of the body 177. The two thermocouples 180 and 182 are inserted into these holes. Each of the thermocouples 180, 182 has two wires, one of platinum and the other of a platinum-rhodium alloy, in a tantalum sheath 186. The junctions of these thermocouples are located at the lower ends of the holes immediately adjacent to the specimen, although not touching the specimen. The sheaths 186 terminate in insulating cylinders 188, 198, respectively. These cylinders extend through holes in the disc 165 and plate 171 (FIG. 2). Leads from the thermocouples extend from the cylinders 188 and 198 and are brought out to terminals 202, 204 which may be connected to metering circuits. The use of two thermocouples allows a temperature read-out which corresponds to the average temperature of the specimen, since the thermocouples 180 and 182 are near opposite ends of the specimen.

The inner conical wall 192 (FIG. 3) of the body 177 defines a cone angle of approximately forty-five degrees. The body 177 may be tilted almost twenty-two and one-half degrees in opposite directions with respect to the electron beam axis without interfering with the passage of the beam therethrough. The holder 50 is therefore adaptable for use in stereo microscopy, when held in a tiltable support (not shown).

A coating or film 187 of high resistance material is applied uniformly over the entire surface of the body 177, except along the beveled edge 181 thereof. This coating may be applied in various ways. For example, the coating may be vacuum evaporated or sputtered carbon. Collodial carbon precipitated on the body 177 surfaces from a suspension in a volatile vehicle by evaporation may also be used. It may be desirable to use hydrocarbons chemically cracked on the surface of the ceramic body. Another exemplary coating may be minute carbon particles suspended in a long chain alcohol vehicle, such as polyvinyl alcohol. This suspension is applied as by spraying or brushing it onto the surfaces of the body 177. The coated body 177 is then fired at high temperatures so that the alcohol vehicle becomes volatile and evaporates or burns off, leaving the carbon intimately bonded with the surfaces of the body 177. Instead of carbon, a refractory metal, such as tungsten or molybdenum, may be used.

An apertured, internally threaded cap 189 of ceramic or a high melting point metal, such as molybdenum, may be screwed onto the threads 185 at the apical end of the body 177. A specimen (not shown) may be located in the cap over the aperture therein. Thus, when the cap is screwed in place, the specimen is disposed across the opening through the specimen holder.

The specimen holder also has counter-bored holes 191 through which the screws 169 may extend. There are three such holes 191 circumferentially approximately equidistant from each other.

The heater may be energized by passing current through the coating 187 from a source of direct current, such as a regulated, direct current power supply. The output terminals of this power supply are connected to the ring 163 and to the cup 157 (FIG. 2) which act as electrodes. Current flows from the ring 163 through the disc 165 into the coating along the upper end of the flange 179. The current then flows downwardly through the coating on the inner conical wall 192 of the body 177, around the coating on the apical end 194 of the body 177, and then back through the coating 187 on the outer conical wall 190 of the body 177. The current then flows through the coating on the bottom of the cylindrical flange 179, through the coating on the peripheral wall 183, and then out of the coating on the peripheral wall 183 into the cup 157 and back to the power supply.

Since the area of the coating decreases from the base (wide diameter end) of the conical body 177 toward the apex thereof, the area of the resistance material of the coating decreases towards the apex of the body 177. With a cone angle of about forty-five degrees, about eighty-five percent of the total resistance of the coating 187 is concentrated in twenty-five percent of the surface area of the body near its apical end 194. Accordingly the current encounters more resistance as it flows into and around the apical end 194 of the body 177. Since the heating effect is proportional to the resistance of the coating, the heating is more intense toward the apical end of the body and is localized around the apical end of the body, where the specimen is located. Moreover, the radiating area is reduced at the apex. Accordingly, the heat is concentrated around the specimen.

The ceramic body 177 also acts as a heat capacitor or reservoir, since it has a high specific heat. The effect of the body 177 as a heat capacitor minimizes variations in the heating effect which might be caused by variations in the amplitude of the current. Accordingly, the specimen heat is maintained substantially constant.

In practice, the heater is highly efficient and is capable of heating the specimen from ambient temperature to about 1200° C. in 4.5 to 5.0 minutes with an expenditure of 30 watts (one-half amp. at 60 volts D.C.) of power.

The heater provided by the coated ceramic body 177 is also substantially non-inductive in that electromagnetic fields generated by the sheets of current passing around and through the conical internal and external surfaces of the body 177 counteract each other and are of substantially zero intensity along the axis of the body. The internal and external surfaces of the body 177 have cylindrical symmetry about the axis of the body. Also, the current flows in a direction along the outer peripheral surface which is opposite to the direction of current flow along the inner peripheral surface. The electromagnetic fields generated by the current flowing through these surfaces therefore cancel each other within the conical body 177. Since the axis of the body coincides with the electron beam axis of the microscope, current flow in the body does not adversely affect the electron optics of the microscope.

The body 177 and its associated parts are also subject to thermal expansion and contraction as the temperature of the body 177 increases and decreases. However, the body 177 and the parts associated therewith have cylindrical symmetry about the electron beam axis and the thermal expansion of these parts is substantially uniform. The parts therefore maintain their cylindrical symmetry in spite of dimensional changes. Thermally induced specimen excursions are also negligible. Because cylindrical symmetry is maintained as the holder device expands and contracts, the electromagnetic fields in the vicinity of the beam axis remain negligible for reasons expressed above. Thus, the electron optics of the microscope are substantially unaffected by the operation of the holder device.

*Another specimen stage heating apparatus*

Referring to FIGS. 4 and 5, there is shown a specimen stage somewhat similar to the specimen stage illustrated in FIG. 2. Like parts of both specimen stage are identified with like reference numerals. An annular member 193, in the form of a ring of ceramic material which has a conically tapered rim 195, is received on and in the conically tapered opening 94 in the carrier plate 92. The member 193 also has a central hub which is cylindrical on the upper side thereof and frusto-conical on the lower side thereof. This hub has a circular opening 197 therethrough. The upper part of this opening is cylindrical in shape and the lower part of this opening 197 is frusto-conical and tapers downwardly, inwardly towards the electron beam axis of the microscope. The cylindrical, upper hub part of the member 193 has a circular shoulder 199. This shoulder engages the outer edge of a specimen supporting and heating element 201. The surface of the opening 197 may be coated with some highly reflective, refractory material, such as platinum. This coating reflects the heat generated by the element 201 away from its surrounding objective lens parts. It will be noted that the member 193 has a downwardly extending lower part 193a around the lower end of the element 201 so that the parts of the element 201 subjected to heating effects are shielded from heat radiation.

The element 201 is shown in greater detail in FIG. 5. It includes an annular body 203 of a refractory, such as a dense, high alumina ceramic. The body 203 is also generally of frusto-conical, tubular shape and has a conically tapered inner wall 205 and a conically tapered outer wall 207. The apical end of the inner wall 205 is formed with threads 209. The inner and outer walls 205 and 207 of the body 203 near the wide (base) end of the conical body 203 are cylindrical in shape. Threads 211 are formed in the cylindrical part of the inner wall and threads 213 are formed in the cylindrical part of the outer wall. All of the surfaces of the body except for the upper end 215 and the threaded, cylindrical part of the outer wall 207 thereof are coated with a coating or film 217 of electrical resistance material similar to the material of the coating 187 (FIG. 3). This coating 217 may also be applied in manners similar to those described above for the coating 187 on the device shown in FIG. 3.

A cylindrical tube 219 of a high melting, low thermal expansion metal, such as molybdenum, is disposed at the apical end of the body 203 after the body is provided with its coating 217. The tube 219 may be externally threaded and screwed into the threads 209. A cap 221 of a refractory material, such as molybdenum, having an opening 223, is threaded onto the tube 219. A specimen 240 may be located on the bottom of the cap 221 and disposed across the opening in the tube 219 when the cap is screwed in place.

A cylindrical tube 225 having internal threads on the lower end of its inner wall is screwed onto the threads 213. This tube 225 provides an outer electrode for the heater element. Another cylindrical tube 227 having external threads at its lower end is screwed onto the threads 211 and provides an inner electrode for the heater element.

When the element 201 is disposed in the annular member 193, the lower edge of the outer cylindrical tube 225 engages the shoulder 199 and supports the element 201 in coaxial relationship with respect to the electron beam axis. Current is supplied by way of leads 229 and 231 from a source of direct current power respectively to the outer cylinder 225 and to the inner cylinder 227. This current flows from the outer electrode 225 through the coating 217 on the outer wall 207, around the coating on the apical end of the body, and back through the coating on the inner wall 205 to the inner electrode 227. The area of the coating 217 decreases towards the apical end of the body. Accordingly, the heating effect is greatest near the apical end of the body and becomes localized. The ceramic material of the body 203 also acts as a heat capacitor and the temperature of the body is maintained constant. At lower temperatures, the resistance of the tube 219 is negligible. However, when the temperature increases, the electrical resistance of the tube 219 also increases. Accordingly, heat is generated within the tube itself at higher temperatures. The heater provided by the coated body 203 is also non-inductive. The electromagnetic fields within the element 201, and especially along the electron beam axis tend to counteract and substantially cancel each other because of the opposite directions of the flow of heating current. In other words, the electromagnetic field along the electron beam axis is substantially zero since the parts of the specimen supporting and heating element 201 are substantially electrically opposite and cancelling at the electron beam axis. Thus, there can be considered to be opposing field generating elements which are mirror images of each other on each side of the electron beam axis, as was the case for the device shown in FIG. 3.

Since the specimen supporting and heating element 201 is a symmetrical structure, the thermomechanical effects, such as thermal expansion, do not cause significant specimen excursions or affect the operation of the electron optics of the microscope.

From the foregoing description, it will be apparent that there has been provided novel apparatus for controlling the temperature environment of a specimen under observation in an instrument such as an electron microscope. While the invention has been described as embodied in devices for supporting and heating a specimen in a specimen stage for an electron microscope, it will be appreciated that many variations in the design of specimen heating apparatus for use in electron microscopes or any other scientific instruments, within the scope of the invention, will undoubtedly suggest themselves to those skilled in the art. Accordingly, the foregoing description should be taken merely as illustrative and not in any limiting sense.

What is claimed is:

1. Apparatus for heating a specimen comprising an insulating support of heat resistant material having coaxial, conical interior and exterior surfaces, a coating of electrically resistive material on said surfaces and extending around the apical end of said support between said surfaces, means for mounting said specimen on said support across said apical end thereof, and means for passing electric current through said coating for heating said specimen.

2. In an electron microscope having a specimen stage including a plate having an opening disposed in the electron beam path for receiving a specimen holder in said opening, the improvement comprising a tubular ceramic body disposed in said opening, said body having internal and external surfaces each with cylindrical symmetry about the path of said beam, means for attaching a specimen to said body across said beam path, electrically conductive material for generating heat when current is passed therethrough coating said surfaces, and means for passing current through said coating on said external and internal surfaces for establishing electric fields emanating from said external surface and said internal surface which substantially cancel each other along said beam path.

3. In an electron microscope having a specimen stage including a plate having an opening disposed in the electron beam path for receiving a specimen holder in said opening, the improvement comprising an annular ceramic body disposed in said opening with its axis along said beam path, said body having frusto-conical internal and external surfaces, means for attaching said specimen to said body across said beam path, and electrically conductive material for generating heat when current is passed therethrough coating said surfaces and the apical end of said body, and means for passing current through said coating on said external and internal surfaces and said apical end to establish electric fields emanating therefrom which substantially counteract each other along said beam path.

4. In an electron microscope having a specimen stage including a plate having an opening disposed in the electron beam path of receiving a specimen holder in said opening, the improvement comprising a ring of insulating material in said opening, an annular ceramic body disposed on said ring in said opening, said body having internal and external surfaces each with cylindrical symmetry about the path of said beam, means for attaching said specimen to said body across said beam path, electrically conductive material for generating heat when current is passed therethrough disposed on said surfaces, means for passing current through said coating on said external and internal surfaces to establish electric fields emanating from said external surface and said internal surface which substantially cancel each other along said beam path, and shielding means having a heat reflecting surface spaced from said plate and said body extending around said body external surface.

5. A specimen holding and heating device for use in an electron microscope, said device comprising a tubular body of a refractory having coaxial, conical, external and internal surfaces which meet at the apical end of said body, and a coating on said surfaces and around said apex of electrically resistive material providing greater heating effect near said apical end than in the rest of said body, and means for mounting a specimen across said apical end for interception by an electron beam projected through said body.

6. A specimen holding and heating device for use in an electron microscope, said device comprising a tubular body of an insulating refractory having coaxial, conical, external and internal surfaces which meet at the apical end of said body, said body having an annular flange extending outwardly from its external surface at the end of said body opposite from said apical end, a uniform coating of electrical resistance material on the said surfaces of said body except for a ring along said flange, means for mounting a specimen across said apical end for interception by an electron beam projected through said body, and electrical terminals connected to said coating on opposite sides of said ring.

7. A specimen holding and heating device for use in an electron microscope, said device comprising a tubular body of a refractory having coaxial, conical, external and internal surfaces which meet at the apical end of said body, a uniform coating of electrical resistance material on the said surfaces of said body, and means for mounting a specimen across said apical end for interception by an electron beam projected through said body.

8. In an electron microscope having a specimen stage adapted to receive a specimen holder, a combined specimen holder and heating element which comprises an insulating refractory carried by said stage, said refractory having external and internal conical surfaces and an apical end surface, a coating of high resistance material integral with said conical surfaces and end surface and uniformly distributed over said surfaces for providing an electrical heating circuit extending from the large diameter end of said external conical surface, through said external conical surface, around said apical end surface, and back through said internal conical surface to the large diameter end thereof, separate electrical connections to said large diameter ends of said external and internal conical surface coatings, and means for attaching a specimen to said refractory across the apical end thereof.

9. In an electron microscope having a specimen stage including a plate having an opening disposed in the electron beam path for receiving a specimen holder in said opening, the improvement comprising a ring of insulating material in said opening, an annular body of refractory material held by said ring in said opening, said body having internal and external surfaces coated with electrically resistive material, a tube of metal mounted coaxially with said body at an end thereof, and means for mounting said specimen across the opening in said tube.

10. In an electron microscope having a specimen stage including a plate having an opening disposed in the electron beam path for receiving a specimen holder in said opening, the improvement comprising a ring of insulating material in said opening, an annular ceramic body held by said ring in said opening, said body having conically tapered internal and external surfaces coated with electrical resistive material, a cyclindrical tube of molybdenum mounted coaxially with said body at the apical end of its said surfaces, and means for mounting said specimen across the opening in said tube.

References Cited in the file of this patent

UNITED STATES PATENTS

| 2,266,082 | Ruska | Dec. 16, 1941 |
| 2,423,158 | Runge et al. | July 1, 1947 |
| 2,753,458 | Kayato et al. | July 3, 1956 |

FOREIGN PATENTS

| 162,702 | Australia | Sept. 17, 1953 |